No. 781,828. PATENTED FEB. 7, 1905.
E. C. JANSON.
COIN CONTROLLED APPARATUS FOR DELIVERY OF LIQUIDS.
APPLICATION FILED MAY 24, 1904.
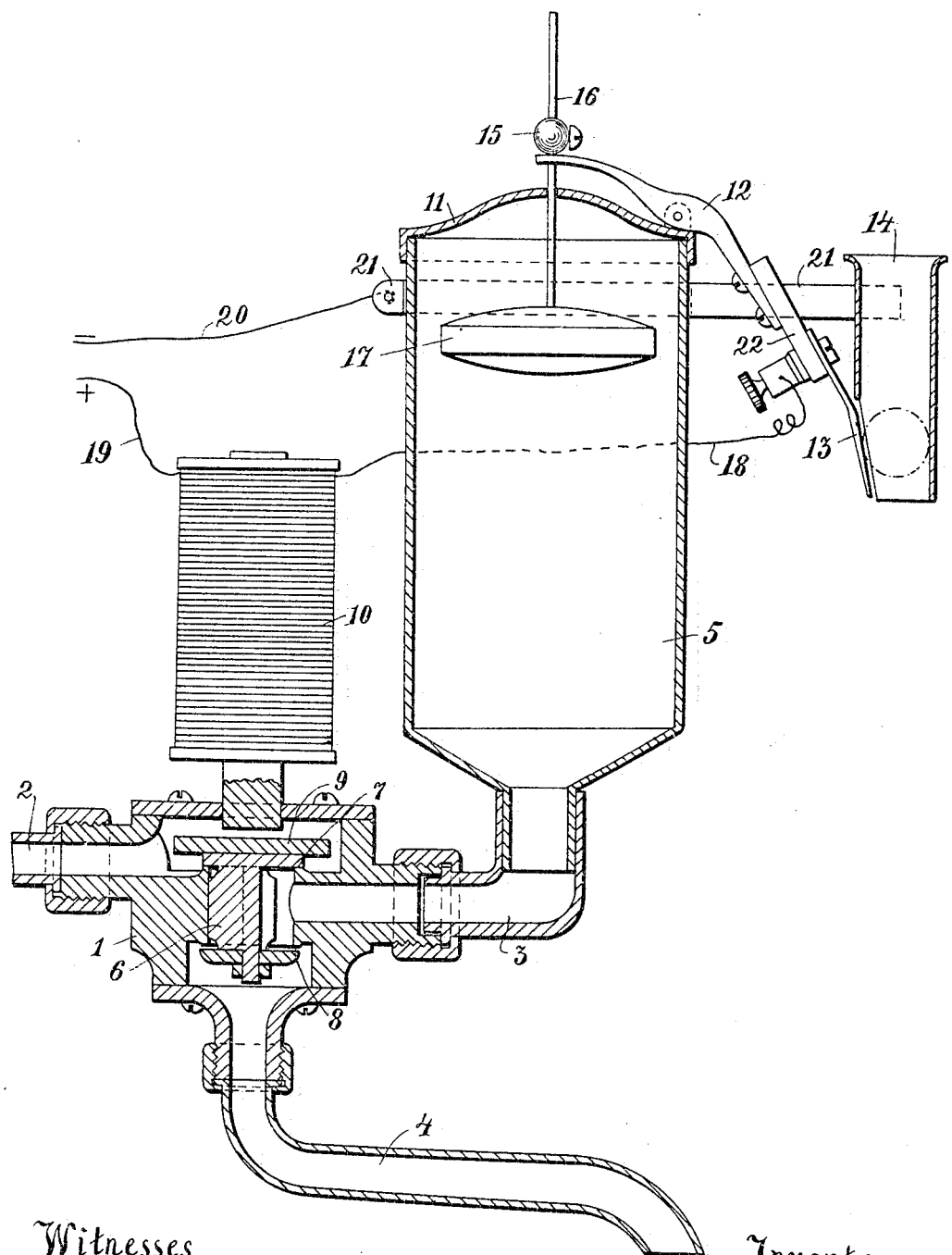
Witnesses
Inventor No. 781,828.

Patented February 7, 1905.

UNITED STATES PATENT OFFICE.

ERIK CLAES JANSON, OF STOCKHOLM, SWEDEN, ASSIGNOR TO ADOLF OHMAN, OF STOCKHOLM, SWEDEN.

COIN-CONTROLLED APPARATUS FOR DELIVERY OF LIQUIDS.

SPECIFICATION forming part of Letters Patent No. 781,828, dated February 7, 1905.

Application filed May 24, 1904. Serial No. 209,471.

*To all whom it may concern:*

Be it known that I, ERIK CLAES JANSON, a subject of the King of Sweden and Norway, and a resident of Stockholm, Sweden, have invented new and useful Improvements in Coin-Controlled Apparatus for Delivery of Liquids, of which the following is a specification, reference being had to the drawing accompanying and forming a part hereof.
The present invention relates to coin-controlled apparatus for delivery of liquids.

The object of the invention is to make such apparatus simple in construction and reliable in working.
The invention consists in the combinations and arrangements of parts hereinafter described and claimed.

In the accompanying drawing I have shown an apparatus embodying my invention.
The figure represents a vertical section of the said apparatus.

An apparatus according to this invention consists of four main parts—viz., a valve-casing, one or more electromagnets working upon a double valve, a measuring vessel, and an automatically-operating circuit-breaker. From the valve-casing 1 extend three pipes or the like 2, 3, and 4, the first one, 2, leading to a liquid-holder, (not shown;) the second, 3, leading to a measuring vessel 5, and the third, 4, forming an outlet or spout through which the liquid flows out from the said measuring vessel 5. In the said valve-casing is arranged a double valve 6, adapted to tighten in its lower end position against a valve-seat 7 and in its upper end position against a valve-seat 8, thus placing the measuring vessel 5 in communication with the outlet 4 and the pipe 2, respectively. To the said valve 6 is secured an armature 9, adapted to be attracted by an electromagnet 10 when the latter is energized. To the measuring vessel 5 or at the cover 11 of the same, as shown in the drawing, is pivoted a two-armed lever 12, provided at the one end with an insulating-block 22, to which is fixed a contact-plate 13, which in the position of the lever shown in the drawing is opposite and near to a slot in the coin-channel 14 without touching the latter. The upper side of the other end of the said lever 12 bears against a ball 15 or the like, shiftably attached to a rod 16, that reaches out through the cover 11 of the measuring vessel and is attached to a float 17 within the measuring vessel. The electromagnet 10 is by a wire 18 connected with the contact-plate 13 and by a wire 19 connected with the one pole of a suitable electric current source, such as a galvanic battery, (not shown,) the other pole of which is connected by a wire 20 with a metal frame 21, which contains the coin-channel 14, likewise made of metal.

The above-described apparatus works as follows: When a coin is dropped down into the coin-channel, the same will establish an electrical connection between the coin-channel 14 and the contact-plate 13, whereby the circuit of the electromagnet 10 will be closed and the valve 6 lifted into its upper end position. The liquid will then flow through the pipe 2 into the measuring vessel and reaching the float 17 lift the latter, so as to release the lever 12, which on account of the weight of its lower arm will turn so that the contact-plate 13 is removed from the coin-channel 14 and the coin drops down, thereby breaking the circuit of the electromagnet 10. The valve 6 will then drop into the position shown in the drawing, thereby interrupting the communication between the pipe 3 and the measuring vessel, establishing communication between the latter and the outlet 4, through which the liquid contained in the measuring vessel flows out. Through its own weight the float then will sink into the position shown in the drawing, turning back the lever 12, so that the contact-plate 13, as before, is placed near the coin-channel 14 without touching the same.

I am aware that electromagnetically-operated coin-controlled apparatus for liquids are known before; but in those apparatus common cocks have been used, the plugs of which have been provided with arms constituting armatures for the electromagnets. Such arrangements suffer from the disadvantage that the electromagnets must be of comparatively large dimensions on account of the extensive motion of the arms of the plugs.

Having now described my invention and in what manner the same may be performed, what I claim is—

In a coin-controlled apparatus for liquids the combination, of a valve-casing, an up-and-down-movable valve in the same, an electromagnet, an armature of the latter secured to the said valve, a measuring vessel connected to the said valve-casing, a float in the latter, an upright rod on the said float reaching out from the said measuring vessel, a lever pivoted to the latter and actuated by the said float, a contact-piece secured to the said lever, a metallic coin-channel having a slot near which the said contact-piece is normally held, the said coin-channel and contact-piece being connected in circuit with the said electromagnet and a source of electric current, substantially as and for the purpose set forth.

In testimony whereof I have signed my name to this specification in the presence of two subscribing witnesses.

ERIK CLAES JANSON.

Witnesses:
GERDA LINDKVIST,
EVALD DELMAR.